2,785,954

PROCESS FOR THE PRODUCTION OF HYDROXYLAMINE SULFATE SOLUTIONS

Kurt Kahr, Ems, Switzerland, assignor to Inventa A. G. fuer Forschung und Patentverwertung, Zurich, Switzerland No Drawing. Application March 3, 1953, Serial No. 340,169

Claims priority, application Switzerland August 27, 1949

1 Claim. (Cl. 23—117)

This invention relates to a new method for the production of hydroxylamine sulfate. The present application is a continuation-in-part of my copending application, Serial No. 178,989, now abandoned.

It is known that hydroxylamine sulfate solutions are obtained from ammoniacal ammonium nitrite solutions by adding sulfur dioxide (cold) and subsequently heating the mixture.

The hydroxylamine ammonium disulfonate formed as an intermediary product is hydrolyzed into hydroxylamine sulfate by heating of the solution.

The thus obtained hydroxylamine sulfate solutions may be directly used to oximize ketones and aldehydes.

It is an object of the present invention to improve the operational technique of the process and the yield of the hydroxylamine sulfate formed in the process.

This is accomplished, according to the invention, by reacting an aqueous solution of ammonium nitrite containing ammonium carbonate in disulfonate solution of hydroxylamine, which is maintained at a pH between 2 and 4 with sulfur dioxide in the cold in a continuously circulated closed system of the cooled solution of disulfonate.

In carrying out the process, ammonium nitrite solution containing ammonium carbonate is introduced at one point of the system. Such solutions are, for instance, obtained by the absorption of nitrous gases in concentrated ammonium bicarbonate-ammonium carbonate solution and adding ammonia.

This solution is introduced into a large body of previously formed disulfonate solution of hydroxylamine, into which sulfur dioxide is also being introduced at another point of the system. The amount of $SO_2$ introduced is so adjusted that a pH value of 2–4 will be maintained. New quantities of disulfonate solution are thus formed. The circulating solution is cooled so as to maintain the temperature at which reaction occurs between 0° and —3° C. in order to avoid premature hydrolysis. A portion of hydroxylamine disulfonate solution is withdrawn from the system and undergoes decomposition by heat treatment in presence of water, whereby hydroxylamine sulfate is formed. Preferably the solution is heated to about boiling temperature for half an hour. Carbon dioxide, which evolves at the same time, is withdrawn and may be recovered by re-absorption.

The continuous production was, hitherto, not possible, due to the fact that in the absorption of $SO_2$ at the beginning of the process, the pH value must not be lower than about 6 in order that the formation of byproducts be avoided and thereby the yield of hydroxylamine-disulfonate is increased.

On the other hand, the pH value of the final solution has to be much lower than 6, i. e. 2–4 in order to render the reaction complete. Maintaining the pH value is facilitated by the presence of carbon dioxide in the solution.

Attempts have been made to overcome the above-mentioned difficulty by working in stages in order to make the losses, due to formation of nitrous gases, less considerable and to arrive at fairly acceptable yields by making the reaction as complete as possible. However, these attempts were only partly successful.

A real solution to the problems involved has only now been found, by making the process continuous in a single stage. This was done by resorting to the use of a large amount of previously prepared hydroxylamine disulfonate solution, preferably cooled down to below 0° C., and allowing the reaction to proceed in that solution. As mentioned before, the starting materials, i. e. solutions of ammonium nitrite and ammonium carbonate as well as sulfur dioxide, are passed through continuously. By allowing the reaction between the ammonium salts and $SO_2$ to occur in the presence of hydroxylamine disulfonate, the otherwise very violent reaction is slowed down; as a consequence thereof, the reaction heat, which, as a rule is hard to dispose of, is removed in the moment of the formation, and it becomes easier to maintain the required low temperature even though the throughput as a whole is high.

By carrying out the process according to the invention, a yield of more than 90% of hydroxylamine sulfate is obtained, calculated on the basis of the ammonium nitrite quantity used.

The process according to the invention will now be described in an example but it should be understood that this is given by way of illustration and not of limitation and that many modifications can be made without departing from the spirit of the invention.

*Example*

A hydroxylamine disulfonate solution previously obtained by reaction of sulfur dioxide on an ammonium nitrite solution, containing ammonium carbonate, is pumped into a closed system for circulating solution which is being maintained at a temperature of —3° C. by passing a cooling system of evaporating liquid ammonia. The system comprises a tower filled with Raschig rings, onto which the formed solution of disulfonate is passed from the top, and from which it is withdrawn at the bottom. Beyond the tower, I introduce into the circulating system hourly 250 parts by volume of an ammonium nitrite solution with a content of 118 g./l. and 88.5 g./l. of ammonium carbonate.

Into the lower part of the tower I introduce 206,000 parts by volume of 10% sulfur dioxide containing gas, so as to obtain a pH rating of about 2–4 in the circulating system of solution. The 90% of the inert gases remaining after absorption of the sulfur dioxide escape from the upper part of the tower.

The disulfonate solution, newly formed in the liquid circulating system and removed from the bottom of the tower, is passed through a heating coil to a heated tower filled with Raschig filter rings, from which hourly about 250 parts by volume of hydroxylamine sulfate solution with a content of 135 g./l. are discharged.

Apart from the simplification in the carrying out of this process, there are other advantages involved. In the reaction vessel, to which the ammonium nitrite solution is continuously admitted, there is a disulfonate solution present. Tests carried out by applicant have shown that when work is done in batches, the reaction is most turbulent at the start when disulfate and sulfur dioxide are introduced into ammonium-nitrite solution; only when very good cooling and stirring is applied it is possible to withdraw the reaction heat fast enough.

The evenly high yields obtainable by the process according to the invention should be attributed to the rapid absorption of sulfur dioxide under constantly maintained conditions of pH, temperature and salt concentration, which conditions can only be maintained in the continuous process here described.

I claim:

The process of producing hydroxylamine sulfate solutions which comprises introducing a solution of ammonium nitrite, and ammonium carbonate, into a large body of disulfonate solution of hydroxylamine, with a pH between 2-4, continuously circulated in a closed system, introducing sulfur dioxide into the circulating solution at another point in the system, reacting the sulfur dioxide, ammonium carbonates and ammonium nitrite to form additional disulfonate solution, cooling the circulating solution to maintain the reaction temperature between 0° C. and −3° C., withdrawing a portion of the hydroxylamine disulfonate solution from the circulating system, and heating the withdrawn portion of the solution to about 95–100° C. to hydrolyze the hydroxylamine disulfonate to hydroxylamine sulfate.

References Cited in the file of this patent

UNITED STATES PATENTS

| | | |
|---|---|---|
| 1,010,177 | Raschig | Nov. 28, 1911 |
| 2,458,404 | Nagle | Jan. 4, 1949 |
| 2,677,599 | Zeegers | May 4, 1954 |

FOREIGN PATENTS

| | | |
|---|---|---|
| 3,028 | Great Britain | of 1887 |

OTHER REFERENCES

Mellor: "Comprehensive Treatise on Inorganic and Theoretical Chemistry," vol. 8 Longmans, Green and Co., N. Y., 1928, pages 283, 284, 302.